ововgreater# 2,984,539

PROCESS FOR DYEING POLYACRYLONITRILE MATERIAL

Erich Matter, Riehen, Otto Albrecht, Neue-Welt, and Armin Hiestand, Binningen, Switzerland, assignors to Ciba Limited, Basel, Switzerland No Drawing. Filed Jan. 20, 1959, Ser. No. 787,810
Claims priority, application Switzerland Jan. 14, 1957
6 Claims. (Cl. 8—55)

The present invention is a continuation-in-part of our application Serial No. 706,281, filed December 31, 1957, now abandoned, and relates to a method of dyeing polyacrylonitrile materials.

The present invention provides an improvement in dyeing materials of polyacrylonitrile and of copolymers of acrylonitrile with basic dyestuffs, which comprises adding to the dye-bath a di-quaternary ammonium compound of the general formula (I)
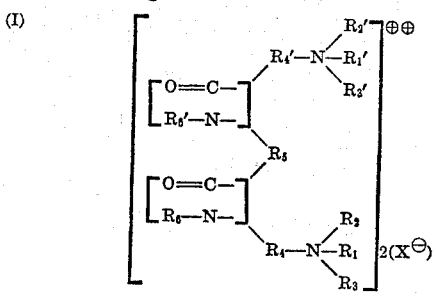

in which $R_1$ and $R_1'$ each represents high molecular aliphatic hydrocarbon radicals, especially an alkyl radical having from 10 to 18 carbon atoms, $R_2$, $R_2'$, $R_3$ and $R_3'$ represent the same or different aliphatic, cycloaliphatic, araliphatic or aromatic radicals, in which $R_2$ and $R_3$, and/or $R_2'$ and $R_3'$ may together constitute a divalent aliphatic radical, $R_4$ and $R_4'$ represent alkylene radicals, $R_5$ represents a divalent aliphatic or aromatic radical, $R_6$ and $R_6'$ represent a hydrogen atom or a low molecular aliphatic radical, and X represents an anion.

As the radicals $R_2$, $R_2'$, $R_3$ and $R_3'$ there come into consideration, more especially, low molecular alkyl and hydroxyalkyl groups, also high molecular aliphatic hydrocarbon radicals, as, for example, alkyl radicals having from 10 to 18 carbon atoms.

The invention is concerned, more especially, with compounds of the general symmetrical formula (II)
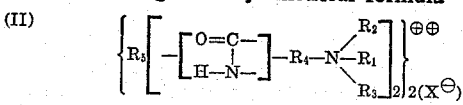

in which $R_1$, $R_2$, $R_3$, $R_4$ and $R_5$ and X have the meanings given above.

The compounds possess valuable properties as levelling agents or so-called "retarders" in the dyeing of shaped bodies such as fibers and foils, of acrylonitrile polymers or copolymers, with basic dyestuffs. As the latter there may be used, for example, an amino group-containing, sulfonic acid-free dyestuff of the triarylmethane series which contains in the para-position to the central carbon atom 1 to 3 amino-, alkylamino-, aralkylamino- or arylamino-groups. There also come into consideration sulfonic acid group-free oxazine dyestuffs, in which two carbon atoms of the oxazine ring at the same time form part of a six-membered aromatic ring, and in which the molecule also contains at least one amino group in para-position to the nitrogen atom of the oxazine ring. Finally there may be mentioned basic polymethine dyestuffs, for example, of the formula

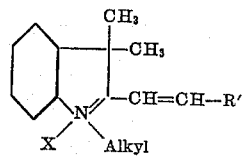

in which R′ represents a basic group containing an aromatic or heterocyclic radical and X represents an anion.

The dyeing of polyacrylonitrile fibers in the presence of a compound of the invention as a retarding agent may be carried out according to known methods. The dyestuff can in general be used directly as such, that is, in the form of the dyestuff salt and the dyeing advantageously caried out at a raised temperature in a weakly acid, for example, acetic acid, aqueous bath, to which there is added as retarding agent the diquaternary ammonium compound, for example, in a concentration of 1.5 to 2% calculated on the weight of the fibers. The dyeing process may be commenced at a temperature ranging from 40 to 70° C. and finished at the boiling temperature, or the dyeing may be carried out under pressure, that is to say, in a closed vessel at a temperature of from 100 to 130° C. The presence of the diquaternary ammonium compound exerts a retarding action on the basic dyestuff and thereby causes a uniform absorption thereof. With the concentration of retarding agent mentioned above a dyebath having the usual concentration of dyestuff is practically exhausted at the end of the dyeing operation.

The dyeings so obtained also possess very good properties of fastness and a very good uniformity.

Especially advantageous as retarding agents are the compounds which correspond to the formula (III)
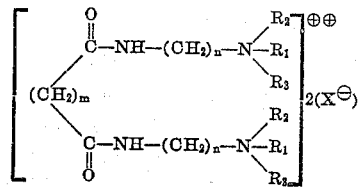

or to the formula (IV)
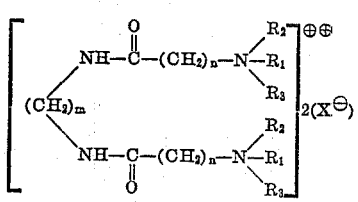

in which $R_1$ represents a straight chain alkyl group, having from 10 to 18 carbon atoms, $R_2$ and $R_3$ represent aliphatic radicals containing 1 to 4 carbon atoms, and $m$ and $n$ are small whole numbers.

Among these compounds there are preferred those of the Formula III or IV in which $R_2$ and $R_3$ represent alkyl groups containing 1 to 4 carbon atoms, $m$ is 2 and $n$ represents a whole number of at most 3.

The compounds can be obtained by known methods. For instance 2 mols of a compound of the formula

(1)

may be quaternised with 1 mol of a compound of the formula

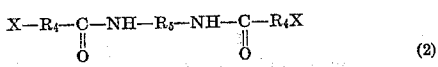
(2)

in which X represents a substituent capable of forming an anion, especially a halogen atom.

As tertiary amines of the Formula 1 there may be mentioned, for example, dimethyl-dodecyl amine, dimethylcetyl amine, dimethyl-octadecyl amine, diethyl-dodecyl amine, dipropyl-dodecyl amine, dibutyl-dodecyl amine, di-hydroxyethyl-dodecyl amine, N:N-dimethyl-para-dodecyl aniline, di-dodecyl-methyl amine, dicetyl-methyl amine and di-octadecyl-methyl amine.

The diamides of the Formula 2 may themselves be prepared by the condensation of 1 mol of a diprimary di- or poly-amine of the formula $$H_2N—R_5—NH_2$$

with 2 mols of a halogeno-fatty acid, or a functional derivative thereof, for example, chloracetic acid or chloracetic acid methyl ester.

The diamides of the Formula 2 in which $R_5$ represents a radical

(in which $R_7$ represents H, —$CH_3$ or —$C_6H_5$) are obtained by the condensation of 2 mols of an N-methylol-amide of the formula

or by means of a catalytic reaction of an aldehyde such as formaldehyde, acetaldehyde or benzaldehyde with acrylonitrile (or its homologues), hydrochloric acid and steam in the gaseous phase.

According to a further process 2 mols of a compound of the formula

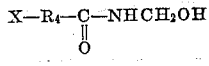
(3)

may be condensed with a compound of the formula

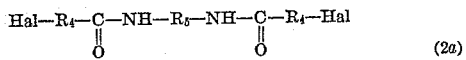
(2a)

with splitting off of hydrogen halide and the condensation product so obtained is then treated with a quaternating agent of the formula $R_3$—X. As such quaternating agents there may be mentioned, for example, dimethyl-sulfate and methyl iodide.

In a yet further process 2 mols of a compound of the formula

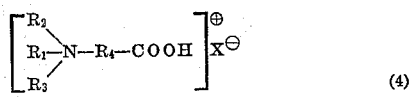
(4)

or a functional derivative thereof, such as acid anhydride, acid ester or acid halide, may be condensed with 1 mol of a diprimary di- or polyamine of the formula $$H_2N—R_5—NH_2$$

The monoquaternary ammonium compounds of the Formula 4 can themselves be obtained by quaternating a tertiary amine of the formula

with a halogeno-fatty acid or functional derivative thereof, as, for example, chloracetic acid or chloracetic acid methyl ester.

As diprimary di- or poly-amines there come into consideration, for example, propylene-diamine, hexamethylene diamine, diethylene-triamine, N-di(2-aminoethyl)-N-methyl amine, 1:4-phenylene diamine and especially ethylene diamine.

Furthermore, it is also possible to condense 2 mols of a tertiary amine of the formula

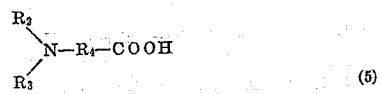
(5)

or a functional derivative of such a carboxylic acid, with a diprimary di- or polyamine, and then treat the di-tertiary amine so obtained with 2 mols of a quarternating agent of the formula $R_1X$. As such quaternating agents there may be mentioned, for example, dodecyl bromide and octadecyl bromide.

Instead of the amines of the Formula 5 there may be used those of the formula

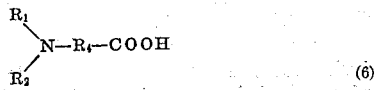
(6)

or a functional derivative thereof, and with the use of a quaternating agent of the formula $R_3X$.

As such quaternating agents there may be mentioned, for example, dimethyl sulfate, ethyl bromide, ethyl iodide, and benzyl chloride.

According to a further method 2 mols of a diamine of the formula

(7)

may be condensed with 1 mol of a dicarboxylic acid of the formula $$HOOC—R_5—COOH$$

or a functional derivative thereof, such as acid anhydride, ester or acid halide, and the ditertiary amine so obtained is treated with 2 mols of a quaternating agent of the formula $R_1X$.

As diamines of the Formula 7 there may be mentioned, for example, N:N-dimethyl ethylene diamine, N:N-dimethyl propylene diamine and N:N-diethyl ethylene diamine.

As dicarboxylic acids there come into consideration malonic acid, glutaric acid, adipic acid, maleic acid, fumaric acid, butadiene-1:4-dicarboxylic acid, terephthalic acid, 1:4-naphthalene dicarboxylic acid and especially succinic acid, or their esters or acid halides.

Instead of a diamine of the Formula 7 there may be used one of the formula

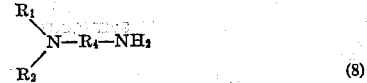
(8)

and as quaternating agent one of the formula $R_3X$.

In addition to their usefulness as retarding agents in the dyeing of polyacrylonitrile fibers and as softening agents for cellulose-containing and synthetic textile materials, the new compounds of the invention also possess a good activity as bactericides and fungicides, and they also find application as antistatic agents, assistants for the levelling and stripping of vat dyes, and as emulsifying agents.

The following examples illustrate the invention, the parts being by weight:

*Example 1*

43 grams of dimethyl-dodecyl amine and 21.2 grams of a compound which had been obtained by condensation in the molecular ratio of 2:1 of chloracetic acid methyl ester with ethylene-diamine, were stirred for 5 hours at 100° C.

There was obtained a light paste which was stirred with 400 ccs. of water-free ether. After suction-filtering in the cold there was obtained a colorless, wax-like mass. This product, which corresponded to the formula $$\left[ C_{12}H_{25}-\underset{\underset{CH_3}{|}}{\overset{\overset{CH_3}{|}}{N}}-CH_2CONHCH_2CH_2NHCOCH_2-\underset{\underset{CH_3}{|}}{\overset{\overset{CH_3}{|}}{N}}-C_{12}H_{25} \right]^{\oplus\oplus} 2Cl^{\ominus}$$

was clear, water-soluble compound which was stable to sodium carbonate.

The quaternating reaction may also be carried out in aqueous solution. In this case the mixture was more easily stirrable.

The di-quaternary ammonium compound so obtained can be used as a retarding agent in the dyeing of polyacrylonitrile fibers in the following manner.

A polyacrylonitrile textile material was immersed in a dye bath of 60° C. which contained 0.5% of the blue dyestuff of the formula

[structural formula of blue dyestuff with oxazine ring, O—C₂H₅, (C₂H₅)₂N— and —N(C₂H₅)₂ substituents, and Cl⁻]

4% acetic acid (40% strength) and 0.15% of the di-quaternary ammonium compound described above (calculated on the weight of the fibers). The temperature was raised in half an hour to the boiling point and dyeing was continued for an hour at the boiling temperature. After this time the bath was practically exhausted. The dyed material was then rinsed and dried.

A strong blue dyeing was obtained having good uniformity.

*Example 2*

The dyeing process is the same as described in Example 1 but there is added one of the following described retarders:

(a) 28.6 grams of a condensation product obtained from 2 mols of dimethylaminopropyl amine and succinic acid dimethyl ester, together with 49.8 grams of dodecyl bromide and 50 ccs. of isopropyl alcohol were stirred for 10 hours at 85 to 90° C. in a current of nitrogen.

After the removal of the solvent there was obtained a yellowish paste which formed a clear solution in water. This product corresponded to the formula $$\left[ C_{12}H_{25}-\underset{\underset{CH_3}{|}}{\overset{\overset{CH_3}{|}}{N}}-CH_2CH_2CH_2NHCOCH_2CH_2CONHCH_2CH_2CH_2-\underset{\underset{CH_3}{|}}{\overset{\overset{CH_3}{|}}{N}}-C_{12}H_{25} \right] 2Br^{\ominus}$$

(b) A mixture of 31.4 grams of a condensation product from 2 mols of dimethylaminopropyl amine and 1 mol of adipic acid ester, and 49.8 grams of dodecyl bromide together with 50 ccs. of isopropyl alcohol was stirred for 10 hours at 54–90° C.

The reaction product was stirred with ether/petroleum ether, decanted after an hour and dried in vacuo. The product so obtained, which corresponded to the formula $$\left[ C_{12}H_{25}-\underset{\underset{CH_3}{|}}{\overset{\overset{CH_3}{|}}{N}}-CH_2CH_2CH_2NHCOCH_2CH_2CH_2CH_2CONHCH_2CH_2CH_2-\underset{\underset{CH_3}{|}}{\overset{\overset{CH_3}{|}}{N}}-C_{12}H_{25} \right] 2Br^{\ominus}$$

was a yellowish paste which dissolved to a clear solution in water.

(c) 88 grams (0.2 mol) of a dialkylamine of the formula $$\begin{array}{c} R \\ \diagdown \\ NH \\ \diagup \\ R \end{array}$$

in which R represents the alkyl radical derived from coconut oil fatty acid (molecular weight 436), were mixed with 21.3 grams (0.1 mol) of a compound which was obtained by the condensation of 2 mols of chloracetic acid methyl ester with 1 mol of ethylene diamine, and the mixture was boiled under reflux in the presence of 200 ccs. of ethanol for 8 hours. After this time a test portion was dispersible in water. Thereupon 8 grams (0.2 mol) of powdered caustic soda were added and the alcoholic solution was concentrated in a vacuum produced by a good water vacuum pump while passing through nitrogen until the product was completely freed from alcohol. To the warm melt at 60° C. 25.2 grams (0.2 mol) of neutral dimethyl sulfate were added. There was obtained a wax-like reaction product of the formula $$\left[ \underset{R}{\overset{R}{\diagdown}}\underset{CH_3}{\overset{|}{N}}-CH_2-\underset{O}{\overset{\|}{C}}-NH-CH_2-CH_2-NH-\underset{O}{\overset{\|}{C}}-CH_2-\underset{CH_3}{\overset{|}{N}}\underset{R}{\overset{R}{\diagup}} \right]^{\oplus\oplus} 2CH_3OSO_3^{\ominus}$$

which was dispersible in hot water. After rubbing it with about 5 times its weight of alcohol the product was soluble in water to a colloidal solution.

What is claimed is:

1. In the method for dyeing materials of polyacrylonitrile and copolymers of acrylonitrile with basic dyestuffs the improvement which comprises adding to the dye-bath as retarder the new di-quaternary ammonium compound of the general formula

[structural formula showing di-quaternary ammonium compound with R₁, R₁', R₂, R₂', R₃, R₃', R₄, R₄', R₅ groups and 2(X⁻)]

in which R₁ and R₁' each represents a high molecular aliphatic hydrocarbon radical containing 10 to 18 carbon atoms, R₂, R₂', R₃ and R₃' each represents an aliphatic hydrocarbon radical, R₄, R₄' and R₅ each represents an alkylene radical and X represents an anion.

2. In the method for dyeing materials of polyacrylonitrile and copolymers of acrylonitrile with basic dyestuffs the improvement which comprises adding to the dyebath as retarder, the new di-quaternary ammonium compound which corresponds to the formula

[structural formula with (CH₂)ₘ bridge, two C(=O)—NH—(CH₂)ₙ—N(R₁)(R₂)(R₃) groups and 2(X⁻)]

in which R₁ represents a straight-chain alkyl radical containing 10 to 18 carbon atoms, R₂ and R₃ each represents an alkyl radical containing 1 to 4 carbon atoms, m and n are small whole numbers of at the most four, and X represents an anion.

3. In the method for dyeing materials of polyacrylonitrile and copolymers of acrylonitrile with basic dyestuffs the improvement which comprises adding to the dyebath as retarder, the compound of the formula

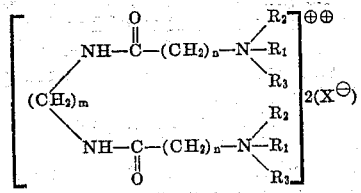

in which $R_1$ represents a straight-chain alkyl radical containing 10 to 18 carbon atoms, $R_2$ and $R_3$ each represents an alkyl radical containing 1 to 4 carbon atoms, $m$ and $n$ are small whole numbers of at the most four, and X represents an anion.

4. In the method for dyeing materials of polyacrylonitrile and copolymers of acrylonitrile with basic dyestuffs the improvement which comprises adding to the dyebath as retarder, the compound of the formula

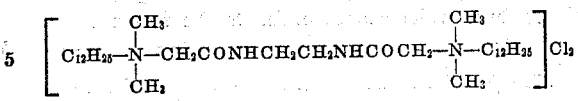

5. In the method for dyeing materials of polyacrylonitrile and copolymers of acrylonitrile with basic dyestuffs the improvement which comprises adding to the dyebath as retarder, the compound of the formula

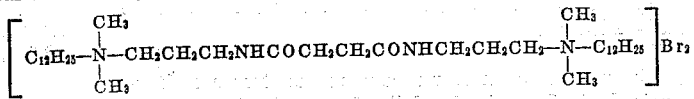

6. In the method for dyeing materials of polyacrylonitrile and copolymers of acrylonitrile with basic dyestuffs the improvement which comprises adding to the dyebath as retarder, the di-quaternary ammonium compound of the formula

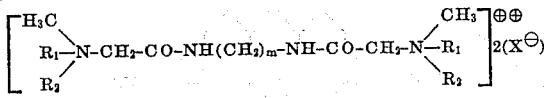

in which $R_1$ and $R_2$ each represent a straight-chain alkyl group containing from 10 to 18 carbon atoms, $m$ is a whole number from 1 to 3 and X represents an anion.

References Cited in the file of this patent

UNITED STATES PATENTS

| | | |
|---|---|---|
| 2,310,873 | Sauer | Feb. 9, 1943 |
| 2,569,409 | De Benneville | Sept. 25, 1951 |
| 2,765,337 | De Benneville | Oct. 2, 1956 |
| 2,891,835 | Matter | June 23, 1959 |

OTHER REFERENCES

Clarke: Amer. Dyestuff Reporter, August 29, 1955, pp. 631–640.